United States Patent
Kow

(10) Patent No.: US 10,731,880 B2
(45) Date of Patent: Aug. 4, 2020

(54) HUMID AIR STREAM GENERATOR

(71) Applicant: ESD TECHNOLOGY CONSULTING & LICENSING CO., LTD, Shenzhen, Guangdong (CN)

(72) Inventor: Kek Hing Kow, Guangdong (CN)

(73) Assignee: ESD TECHNOLOGY CONSULTING & LICENSING CO., LTD, Shenzhen (CN)

( * ) Notice: Subject to any disclaimer, the term of this patent is extended or adjusted under 35 U.S.C. 154(b) by 224 days.

(21) Appl. No.: 15/765,797

(22) PCT Filed: Oct. 13, 2016

(86) PCT No.: PCT/CN2016/102048
§ 371 (c)(1),
(2) Date: Apr. 4, 2018

(87) PCT Pub. No.: WO2017/063579
PCT Pub. Date: Apr. 20, 2017

(65) Prior Publication Data
US 2018/0299149 A1    Oct. 18, 2018

(30) Foreign Application Priority Data
Oct. 15, 2015   (WO) ................ PCT/CN2015/091978

(51) Int. Cl.
*B01D 45/14*    (2006.01)
*F24F 6/12*    (2006.01)
(Continued)

(52) U.S. Cl.
CPC ................ *F24F 6/12* (2013.01); *B01D 45/14* (2013.01); *B01F 3/04* (2013.01); *B01F 3/04021* (2013.01); *F24F 6/18* (2013.01); *F24F 13/22* (2013.01)

(58) Field of Classification Search
CPC . B01D 45/12; B01D 45/14; B01F 3/04; B01F 3/04021
(Continued)

(56) References Cited

FOREIGN PATENT DOCUMENTS

| CN | 2109523 U | 7/1992 | |
|---|---|---|---|
| CN | 101968246 A | 2/2011 | |
| CN | 102679488 A | * 9/2012 | ................ F24F 6/12 |

OTHER PUBLICATIONS

International Search Report of PCT Patent Application No. PCT/CN2016/102048 dated Jan. 20, 2017.
(Continued)

*Primary Examiner* — Robert A Hopkins

(57) ABSTRACT

A humid air stream generator is disclosed. The humid air stream generator comprises a hollow cylindrical chamber (2) with a mist generator (21) placed inside at the bottom of the hollow cylindrical chamber (2) for generating a continuous stream of humid air, an inlet tubing (22) attached to the hollow cylindrical chamber (2) for feeding a stream of incoming air, an outlet tubing (8) attached to the hollow cylindrical chamber (2), a suction fan (4) placed between the outlet tubing (8) and the mist generator (21) for forming the continuous stream of humid air with the stream of incoming air into a cyclonic air flow which spiral upward towards the outlet tubing (8), so as to eliminate accumulation of water droplets or condensation at an outlet region of the hollow cylindrical chamber (2).

16 Claims, 9 Drawing Sheets

(51) Int. Cl.
*F24F 6/18* (2006.01)
*F24F 13/22* (2006.01)
*B01F 3/04* (2006.01)

(58) Field of Classification Search
USPC .............................................. 55/459.1, 459.5
See application file for complete search history.

(56) References Cited

OTHER PUBLICATIONS

International Search Report of PCT Patent Application No. PCT/CN2015/091978 dated Jul. 15, 2016.

* cited by examiner

HUMID AIR STREAM GENERATOR

FIELD OF THE INVENTION

The present invention relates to static charge reduction technique, and more specific, to a humid air stream generator.

BACKGROUND OF THE INVENTION

In static charge reduction technical field, a humid air stream generator is used to increase the humidity of the air for reducing static charge. In a known air stream controller, the humid air stream for static charge reduction after released from the outlet tubing for use in static charge mitigation is channeled as a returned loop back into the humidifier chamber of the humid air stream generator for re-circulation to achieve better air flow control for optimum output. This closed-loop system not only helps to prevent or minimize the leakage of the humid air into the surrounding ambient environment, it also cuts the wastage of humid air and contributes to an optimum amount of humid air to be produced economically.

FIG. 1 comprises shown a common known humid air stream generator 1 having a main chamber attached with an inlet tubing 12 for feeding dry air and an outlet tubing 19 for outputting moist air. A mist generator 11 is arranged at the bottom of the chamber.

However, during the running of the air stream controller at a relative humidity (RH) especially at above 80%, water condensation was seen on the walls 14 of the chamber and on the inner walls of the outlet tubing 19 as illustrate in FIG. 1.

These tiny droplets accumulate to form bigger drops 13 and subsequently dripping down the walls 14 causing accumulation of water, especially inside the outlet tubing 19 causing unwanted trapping and retention of water inside the tubing. This is undesirable in the management and control of humid air for static charge mitigation in the air flow control system.

It is interesting to discover that putting a mini heater in the air flow path at the region above the mist generator 11 helps to minimize or eliminate such unwanted condensation especially at a level above 80% RH. In fact, up to the 85% to 90% RH range, there is no condensation being seen both at the walls of the outlet air flow region as well as at the inner circular wall of the air circulation tube when the mini heater is switched on. The higher the heater temperature, the lesser the condensation is seen on the walls.

However, careful analysis reveals that the heater not only involves installation work, close monitoring, safety issue and additional cost to the system, it also cause contamination issue after long period of uses due to the oxidation or corrosion, pre-matured wear and tear and dirt accumulation issues using such heater system.

Therefore further research and development work is needed to search for a better and easier way to overcome such condensation problem without design pitfalls and shortcomings.

SUMMARY OF THE INVENTION

The objective of this invention is to provide a humid air stream generator which is better and easier to overcome such condensation problem without design pitfalls and shortcomings.

According to one aspect, a humid air stream generator is provided, which comprising a hollow cylindrical chamber with a mist generator placed inside at the bottom of the hollow cylindrical chamber for generating a continuous stream of humid air, an inlet tubing attached to the hollow cylindrical chamber for feeding a stream of incoming air, an outlet tubing attached to the hollow cylindrical chamber, a suction fan placed between the outlet tubing and the mist generator for forming the continuous stream of humid air with the stream of incoming air into a cyclonic air flow which spiral upward towards the outlet tubing, so as to eliminate accumulation of water droplets or condensation at an outlet region of the hollow cylindrical chamber; the suction fan is a centrifugal fan to allow the continuous stream of humid air and the stream of incoming air to pass through the centrifugal fan, so as to mix them together in forming the cyclonic air flow.

Optionally, the hollow cylindrical chamber comprises a vertical cylindrical lower chamber and a tilted taper upper chamber attached to the top of the vertical cylindrical lower chamber, the outlet tubing is attached to the tilted taper upper chamber, and the suction fan is placed in the vertical cylindrical lower chamber.

Optionally, the outlet tubing further comprising a curving tubing attached to the tilted taper upper chamber and a nozzle mounted on the curving tubing.

Optionally, the hollow cylindrical chamber comprises a vertical cylindrical lower chamber and an extended outlet flow channel branched out from the vertical cylindrical lower chamber, the outlet tubing is attached to the outlet flow channel, and the suction fan is placed in the outlet flow channel.

Optionally, the hollow cylindrical chamber comprises a vertical cylindrical chamber, and the cyclonic air flow in the vertical cylindrical chamber are spun for a distance of at least one quarter of a circumference of the vertical cylindrical chamber.

Optionally, the outlet tubing is attached to a point along the circumference of the vertical cylindrical chamber that is at least 75 degree away from an air outlet of the centrifugal fan.

Optionally, the hollow cylindrical chamber further comprises a main chamber connected to the vertical cylindrical chamber.

Optionally, the hollow cylindrical chamber comprises a vertical cylindrical lower chamber and a recessed roof top, wherein the centrifugal fan is arranged outside the vertical cylindrical lower chamber but at a step surface of the recessed roof top, the outlet tubing is attached to the recessed roof top at a same level of the centrifugal fan.

Optionally, the centrifugal fan is arranged horizontally or vertically on the step surface of the recessed roof top.

Optionally, the recessed roof top have an arc-shaped structure connected to an air outlet of the centrifugal fan and a tangent structure tangentially connected to the arc-shaped structure, wherein the outlet tubing can be attached to an opening of the tangent structure.

Optionally, the hollow cylindrical chamber comprises a vertical cylindrical lower chamber, a first recessed roof top and a second recessed roof top, wherein a first centrifugal fan is arranged vertically outside the vertical cylindrical lower chamber but at a step surface of the first recessed roof top, a second centrifugal fan is arranged horizontally outside the first recessed roof top but at a step surface of the second recessed roof top.

Optionally, the hollow cylindrical chamber comprises a vertical cylindrical lower chamber, a first recessed roof top and a second recessed roof top, wherein a first centrifugal fan is arranged horizontally outside the vertical cylindrical lower chamber but at a step surface of the first recessed roof top, a second centrifugal fan is arranged vertically outside the first recessed roof top but at a step surface of the second recessed roof top.

Optionally, the hollow cylindrical chamber comprises a vertical cylindrical lower chamber and a horizontal cylindrical upper chamber extended from the vertical cylindrical lower chamber, the centrifugal fan is arranged in the hollow cylindrical chamber and the horizontal cylindrical upper chamber, respectively, wherein the outlet tubing is attached to the horizontal cylindrical upper chamber.

Optionally, at least two centrifugal fans are attached horizontally side-by-side next to each other in the horizontal cylindrical upper chamber.

Optionally, the centrifugal fan is attached securely onto a circular plate with a centre hole on the circular plate.

Optionally, the centrifugal fan comprises a drum housing with fins arranged at its middle point, wherein, the drum housing further comprises an air outlet which discharges mixed air in a direction in parallel with or tilted at a small angle to a tangent of the drum housing at the air outlet so as to form the cyclonic air flow along a circumference of an inner wall of the hollow cylindrical chamber.

Optionally, the circular plate is attached securely onto an inner wall of the hollow cylindrical chamber, wherein the fins of the centrifugal fan is right above the centre hole of the circular plate.

Optionally, the centrifugal fan is tilted to a horizontal axis at an angle from 0 degree to 80 degree upwards or downwards from the horizontal axis, preferred from 5 degree to 75 degree, more preferred from 25 degree to 60 degree, most preferred from 35 degree to 50 degree.

Optionally, the cyclonic air flow comprises its flow angle increase as it spiral up, wherein, the flow angle increases from as low as 5 degree up to a maximum of 80 degree as it spiral upwards until it reaches the extreme top of the hollow cylindrical chamber.

Optionally, the humid air stream generator further comprises a heater located inside the hollow cylindrical chamber.

By arranging a suction fan in the hollow cylindrical chamber, the humid air stream generator according to present application effectively eliminates the unwanted water droplets or condensation formed at the inner wall of the hollow cylindrical chamber and the outlet tubing without the use of a heater in a simple and unconventional methodology.

BRIEF DESCRIPTION OF THE DRAWINGS

So as to further explain the invention, an exemplary embodiment of the present invention will be described with reference to the below drawings, wherein.

DETAILED DESCRIPTION OF THE PREFERRED EMBODIMENT

These and other advantage, aspect and novel features of the present invention, as well as details of an illustrated embodiment thereof will be more fully understood from the following description and drawings, while various embodiments of the present invention are presented by way of examples only, not limitation. In the following figures, the arrowhead refers to the direction of the air flow.

Figure 1:
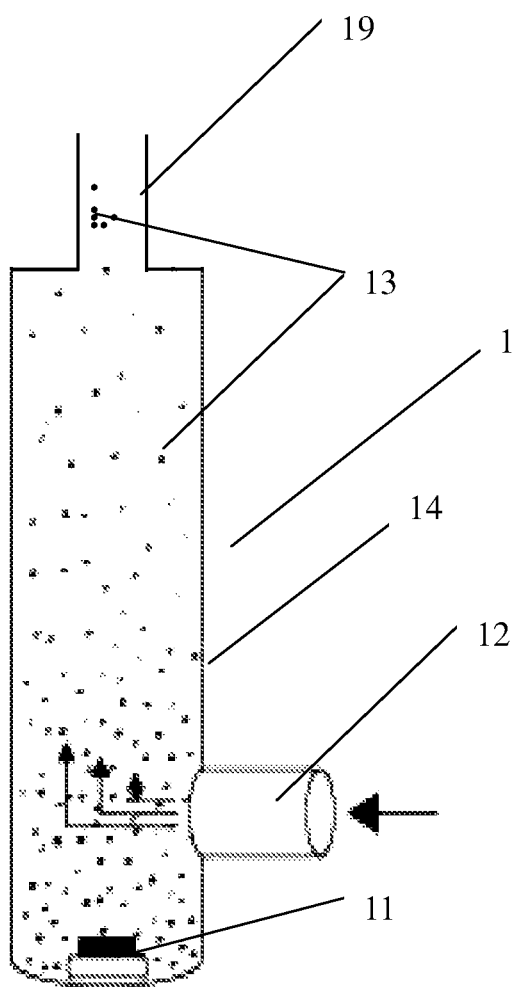
FIG. 1 is a diagram of a common known humid air stream generator.
Figure 2:
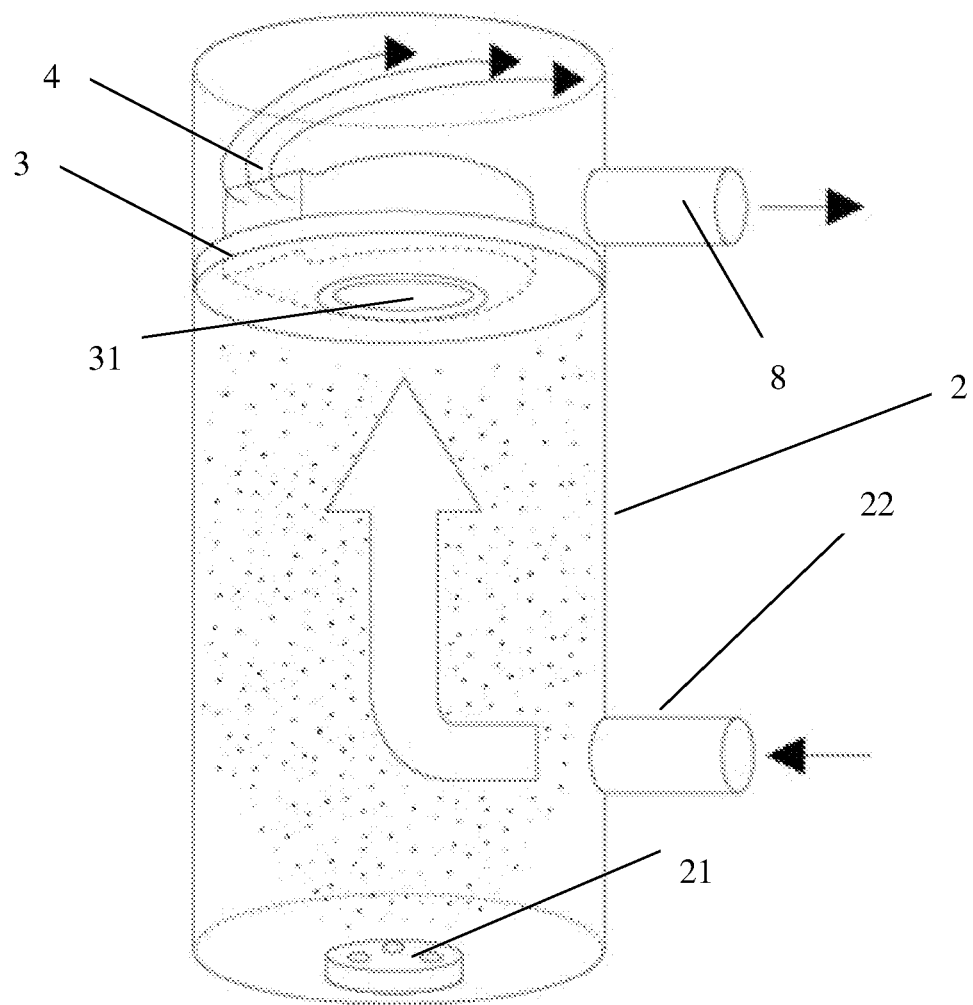
FIG. 2 is a diagram of a humid air stream generator according to an embodiment of the present application.

FIG. 2 is a diagram of a humid air stream generator according to an embodiment of the present application. As shown in FIG. 2, the humid air stream generator comprises a hollow cylindrical chamber 2 with a mist generator 21 placed inside at the bottom of the hollow cylindrical chamber 2 for generating a continuous stream of humid air, an inlet tubing 22 attached to the hollow cylindrical chamber 2 for feeding a stream of incoming air, an outlet tubing 8 attached to the hollow cylindrical chamber 2, a suction fan 4 placed between the outlet tubing 8 and the mist generator 21 for forming the continuous stream of humid air and the stream of incoming air into a cyclonic air flow which spiral upward towards the outlet tubing, surprisingly eliminates accumulation of water droplets or condensation at an outlet region of the hollow cylindrical chamber 2. The stream of incoming air can be returned air or ambient air. It dependents on actual requirements.

As shown in FIG. 2, the suction fan 4 is a centrifugal fan that is attached securely onto a circular plate 3 with a centre hole 31 on the circular plate 3 to allow the continuous stream of humid air and the stream of incoming air to pass through the centrifugal fan, so as to mix them together in forming the cyclonic air flow. The humid air produced by the mist generator 21 is being sucked and passed through the suction fan 4 that is placed at a position around the centre region inside the hollow cylindrical chamber 2.

The centrifugal fan 4 can be any type on the market. Optionally, the centrifugal fan 4 can be arranged by itself at a position around the centre region inside the hollow cylindrical chamber 2 independently, so the circular plate 3 can be omitted.

In the present embodiment, the hollow cylindrical chamber 2 is a vertical cylindrical chamber, the cyclonic air flow in the vertical cylindrical chamber are spun for a distance of at least one quarter of a circumference of the vertical cylindrical chamber. It is a further surprise to discover that even a short spinning distance of about one quarter of the circumference of the vertical cylindrical chamber, the condensation problem on the inner wall lining of the outlet tubing is gone.

Such a short spin of humid airflow from the centrifugal fan in eliminating the condensation problem on the inner wall lining of the outlet tubing 8 is unanticipated and unexpected.

Figure 3:
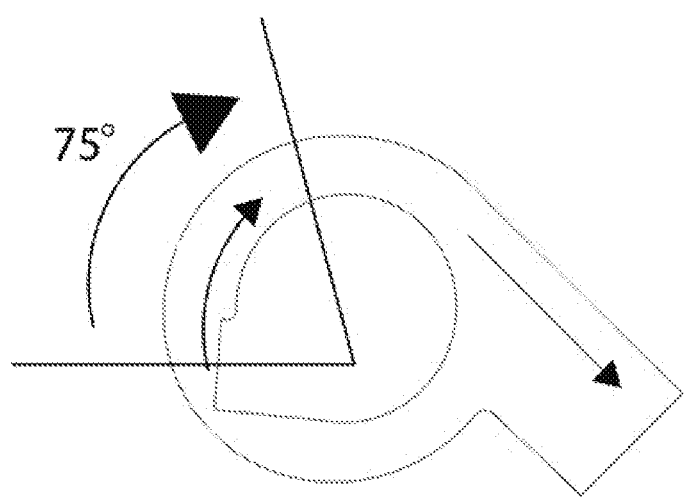
FIG. 3 is a diagram of an angle between the outlet tubing and the air outlet of the centrifugal fan.

In the present embodiment, the outlet tubing 8 is lowered down to the same level as the centrifugal fan and positioned at a spot along the circumference wall of the hollow cylindrical chamber 2. When look from the top view, the outlet tubing 8 is attached to a point along the circumference of the hollow cylindrical chamber 2 that is at least 75 degree away from the air outlet of the centrifugal fan, as shown in FIG. 3. In another embodiment, the outlet tubing 8 can be arranged at the top of the hollow cylindrical chamber 2. However, in other embodiment, outlet tubing 8 can be arranged at other points of the hollow cylindrical chamber 2.

Optionally, a heater is added to the water bath inside the hollow cylindrical chamber 2 to control the ideal temperature for generating an optimum amount of water vapor. The optimum humid air output is achieved by varying the water bath temperature accordingly taking into consideration of the ambient temperature environment and the speed of air inflow and outflow rate to achieve the optimum amount of water vapor generation for use in various static charge mitigation objective.

Figure 4:
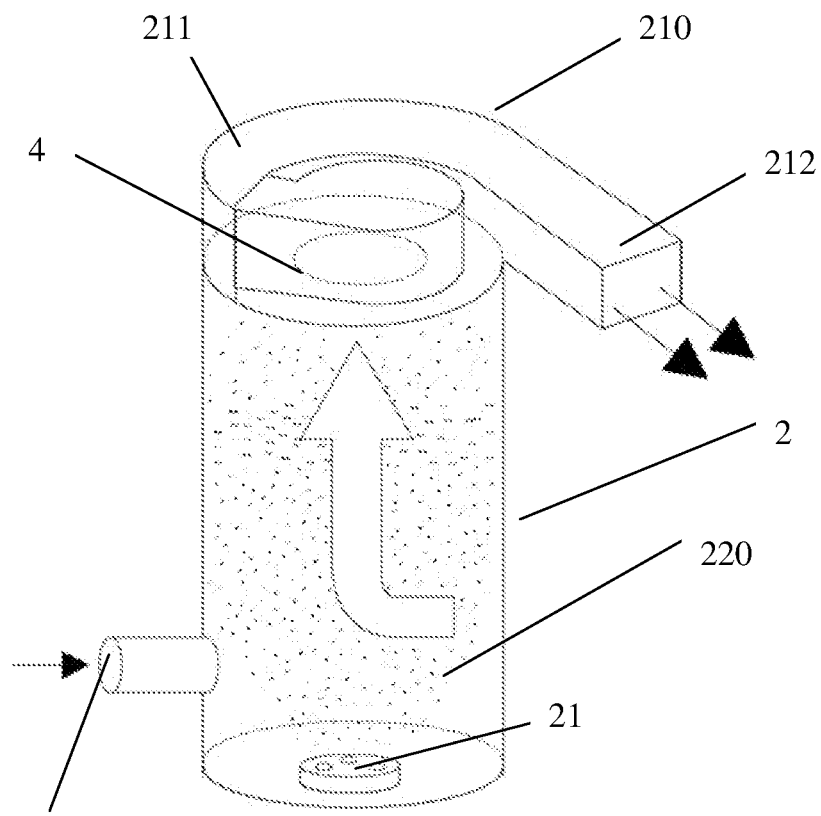
FIG. 4 is a diagram of a humid air stream generator according to an embodiment of the present application.
Figure 5:
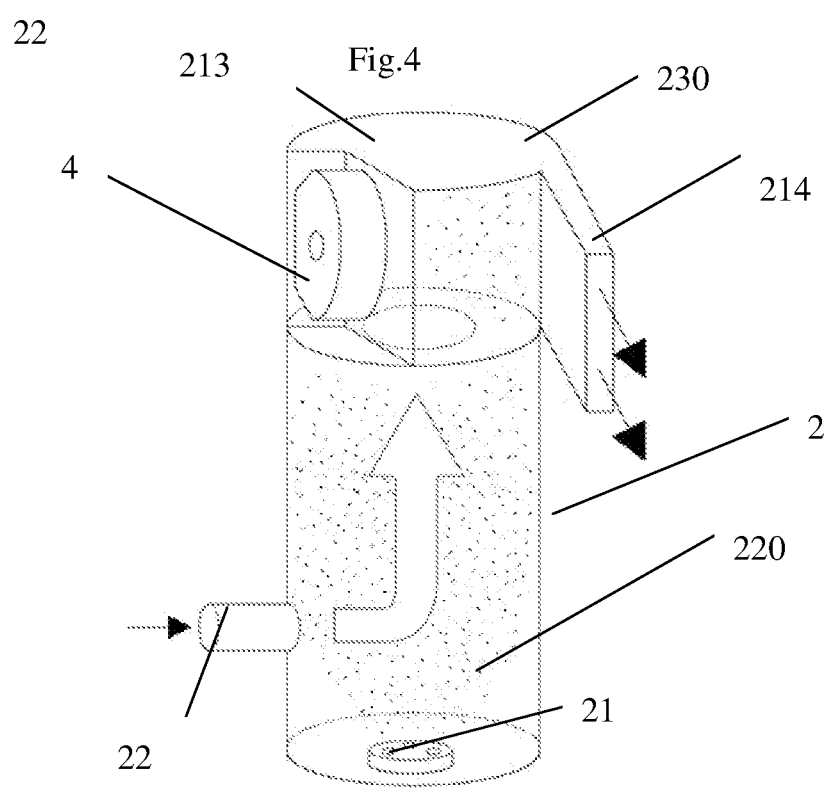
FIG. 5 is a diagram of a humid air stream generator according to an embodiment of the present application.
Figure 6:
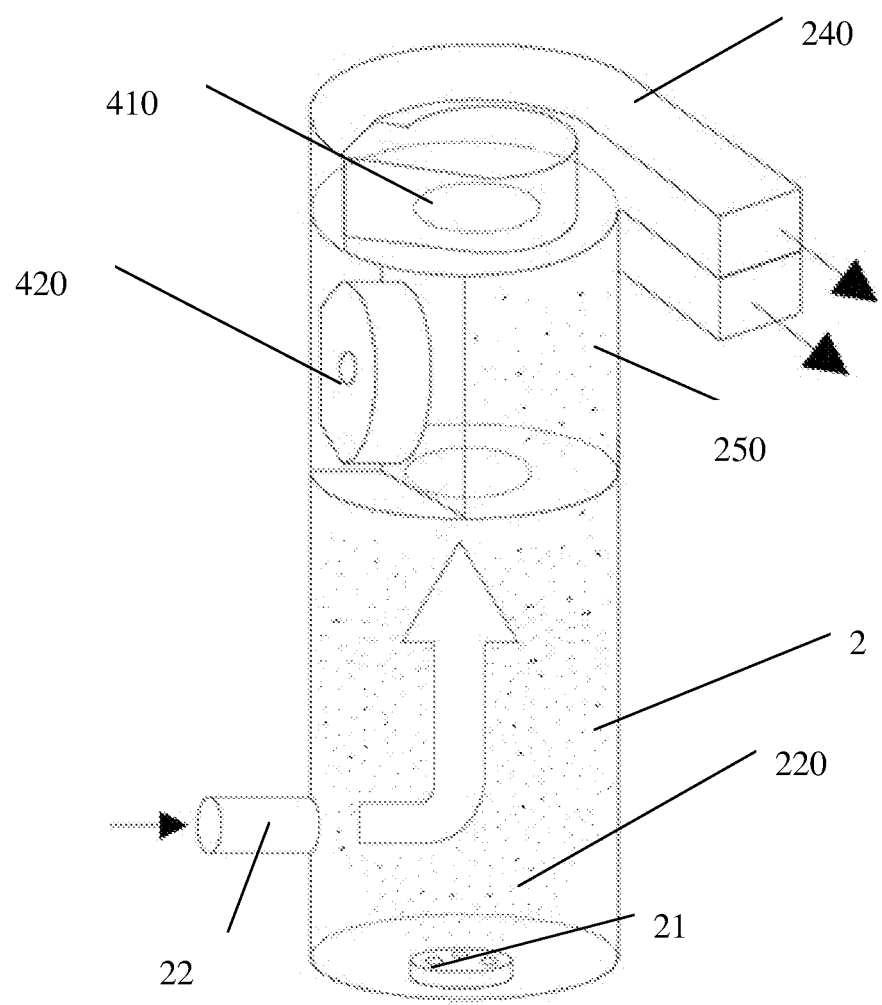
FIG. 6 is a diagram of a humid air stream generator according to an embodiment of the present application.
Figure 7:
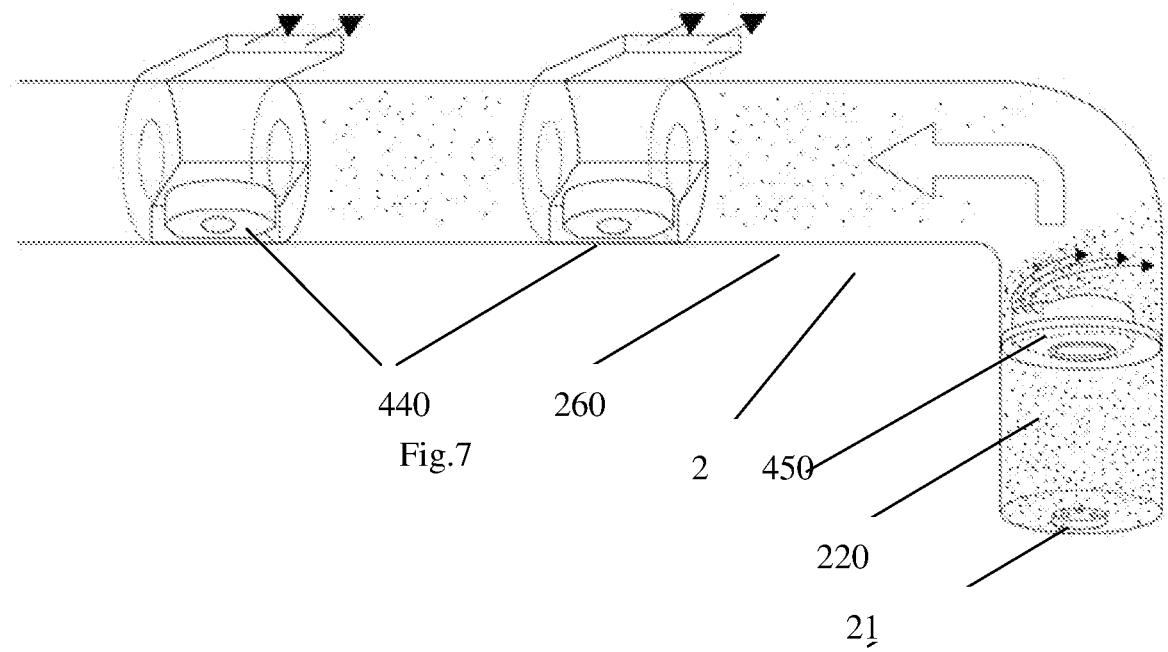
FIG. 7 is a diagram of a humid air stream generator according to an embodiment of the present application.

FIG. 4 is a diagram of a humid air stream generator according to an embodiment of the present application. As shown in FIG. 4, the humid air stream generator comprises a hollow cylindrical chamber 2 with a mist generator 21 placed inside at the bottom of the hollow cylindrical chamber 2 for generating a continuous stream of humid air, an inlet tubing 22 attached to the hollow cylindrical chamber 2 for feeding a stream of incoming air, an outlet tubing (unshown) attached to the hollow cylindrical chamber 2, a suction fan 4 placed between the outlet tubing and the mist generator 21 for forming the continuous stream of humid air and the stream of incoming air into a cyclonic air flow which spiral upward towards the outlet tubing, surprisingly eliminates accumulation of water droplets or condensation at an outlet region of the hollow cylindrical chamber 2. The stream of incoming air can be returned air or ambient air. It dependents on actual requirements.

In the present embodiment, the centrifugal fan 4 can be arranged by itself at a position around the centre region inside the hollow cylindrical chamber 2 independently. As shown in FIG. 4, the hollow cylindrical chamber 2 comprises a vertical cylindrical lower chamber 220 and a recessed roof top 210. In the present embodiment, the centrifugal fan 4 is arranged outside the vertical cylindrical lower chamber 220 but at a step surface of the recessed roof top 210. In the present embodiment, the outlet tubing is attached to the recessed roof top 210 at a same level of the centrifugal fan 4.

In the preferable embodiment of the present application, the recessed roof top 210 is horizontally arranged above the vertical cylindrical lower chamber 220. The centrifugal fan 4 is arranged above the vertical cylindrical lower chamber 220 and on the lower step surface of the recessed roof top 210. The recessed roof top 210 can have an arc-shaped structure 211 connected to the air outlet of the centrifugal fan 4 and a tangent structure 212 tangentially connected to the arc-shaped structure 211. The outlet tubing can be attached to the opening of the tangent structure 212.

In another preferable embodiment, the centrifugal fan 4 can be arranged vertically at any spot on the step surface of the recessed roof top. FIG. 5 is a diagram showing such kind of humid air stream generator. As shown in FIG. 5, the hollow cylindrical chamber 2 comprises a vertical cylindrical lower chamber 220 and a recessed roof top 230. In the present embodiment, the recessed roof top 230 comprises a vertical cylindrical upper chamber 213 arranged above the vertical cylindrical lower chamber 220, and a tangent structure 214 tangentially connected to the vertical cylindrical upper chamber 213. The vertical cylindrical upper chamber 213 is provided with a recessed structure. The centrifugal fan 4 can be arranged vertically at any spot along the vertical wall of the recessed structure. In the present embodiment, the outlet tubing is attached to the recessed roof top 230 at a same level of the centrifugal fan 4.

This embodiment will provides a greater application flexibility especially on application that requires a thin blanket of humid air covering a broad flat surface.

In a preferable embodiment shown in FIG. 6, an extra centrifugal fan can be added to the embodiment shown in FIG. 4 or FIG. 5 to form two centrifugal fans system delivering more power and higher humid air output in providing greater flexibility in the usage of the present application.

As shown in FIG. 6, the hollow cylindrical chamber 2 comprises one vertical cylindrical lower chamber 220, a first recessed roof top 250 and a second recessed roof top 240. As shown in FIG. 6, a first centrifugal fan 420 is arranged vertically outside the vertical cylindrical lower chamber 220 but at a step surface of the first recessed roof top 250, a second centrifugal fan 410 is arranged horizontally outside the first recessed roof top 250 but at a step surface of the second recessed roof top 240. As shown in FIG. 6, the first centrifugal fan 420 and first recessed roof top 250 can be constructed according the embodiment shown in FIG. 4, and the second centrifugal fan 410 and second recessed roof top 240 can be constructed according the embodiment shown in FIG. 5. Based on the teaching of the present application, one skilled in the art can manufacture the humid air stream generator shown in FIG. 6.

In another embodiment, the hollow cylindrical chamber 2 comprises one vertical cylindrical lower chamber 220, a first recessed roof top 250 and a second recessed roof top 240, wherein a second centrifugal fan 410 is arranged horizontally above the vertical cylindrical lower chamber but at a step surface of the first recessed roof top 250, a first centrifugal fan 420 is arranged vertically above the first recessed roof top but at a step surface of the second recessed roof top 240.

FIG. 7 is a diagram of a humid air stream generator according to an embodiment of the present application. As shown in FIG. 7, the humid air stream generator comprises a hollow cylindrical chamber 2 with a mist generator 21 placed inside at the bottom of the hollow cylindrical chamber 2 for generating a continuous stream of humid air, an inlet tubing (unshown) attached to the hollow cylindrical chamber 2 for feeding a stream of incoming air, an outlet tubing attached to the hollow cylindrical chamber 2 (unshown), three centrifugal fans placed between the outlet tubing and the mist generator 21 for forming the continuous stream of humid air and the stream of incoming air into a cyclonic air flow which spiral upward towards the outlet tubing, surprisingly eliminates accumulation of water droplets or condensation at an outlet region of the hollow cylindrical chamber 2.

In the present embodiment, the hollow cylindrical chamber 2 comprises a vertical cylindrical lower chamber 220 and a horizontal cylindrical upper chamber 260 extended from the vertical cylindrical lower chamber 220. One centrifugal fan 450 is arranged in the vertical cylindrical lower chamber 220. Two centrifugal fans 440 are attached horizontally side-by-side next to each other along the horizontal cylindrical upper chamber 260 extended from the vertical cylindrical lower chamber 220.

In other embodiment, there can be more or less centrifugal fans arranged in the horizontal cylindrical upper chamber 260, and there also can be more centrifugal fans arranged in the vertical cylindrical lower chamber 220.

This design is good for the mitigation of static charge on a flat surface or flat panel where the electronic device is placed.

Figure 8:
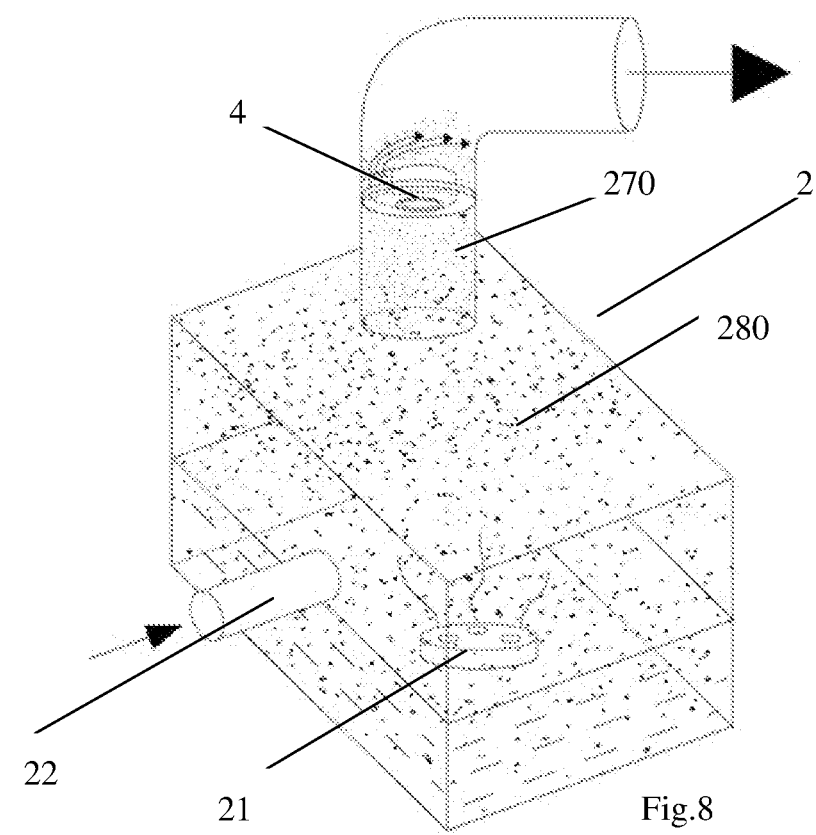
FIG. 8 is a diagram of a humid air stream generator according to an embodiment of the present application.

FIG. 8 is a diagram of a humid air stream generator according to an embodiment of the present application. As shown in FIG. 8, the humid air stream generator comprises a hollow cylindrical chamber 2 with a mist generator 21 placed inside at the bottom of the hollow cylindrical chamber 2 for generating a continuous stream of humid air, an inlet tubing 22 attached to the hollow cylindrical chamber 2 for feeding a stream of incoming air, an outlet tubing attached to the hollow cylindrical chamber 2 (unshown), a centrifugal fan 4 placed between the outlet tubing and the mist generator 21 for forming the continuous stream of humid air and the stream of incoming air into a cyclonic air flow which spiral upward towards the outlet tubing, surprisingly eliminates accumulation of water droplets or condensation at an outlet region of the hollow cylindrical chamber 2.

In the present embodiment, the hollow cylindrical chamber 2 comprises an upper cylindrical chamber 270 and a main chamber 280 connected to the upper cylindrical chamber 270. In the present embodiment, the upper cylindrical chamber 270 comprises a lower vertical cylindrical chamber and an upper horizontal cylindrical chamber. In other embodiment, the upper cylindrical chamber 270 can be constructed in different ways. In the present embodiment, the main chamber 280 is rectangular. Optionally, the main chamber can be any shape including cubical, rectangular, oval or irregular shape.

Figure 9:
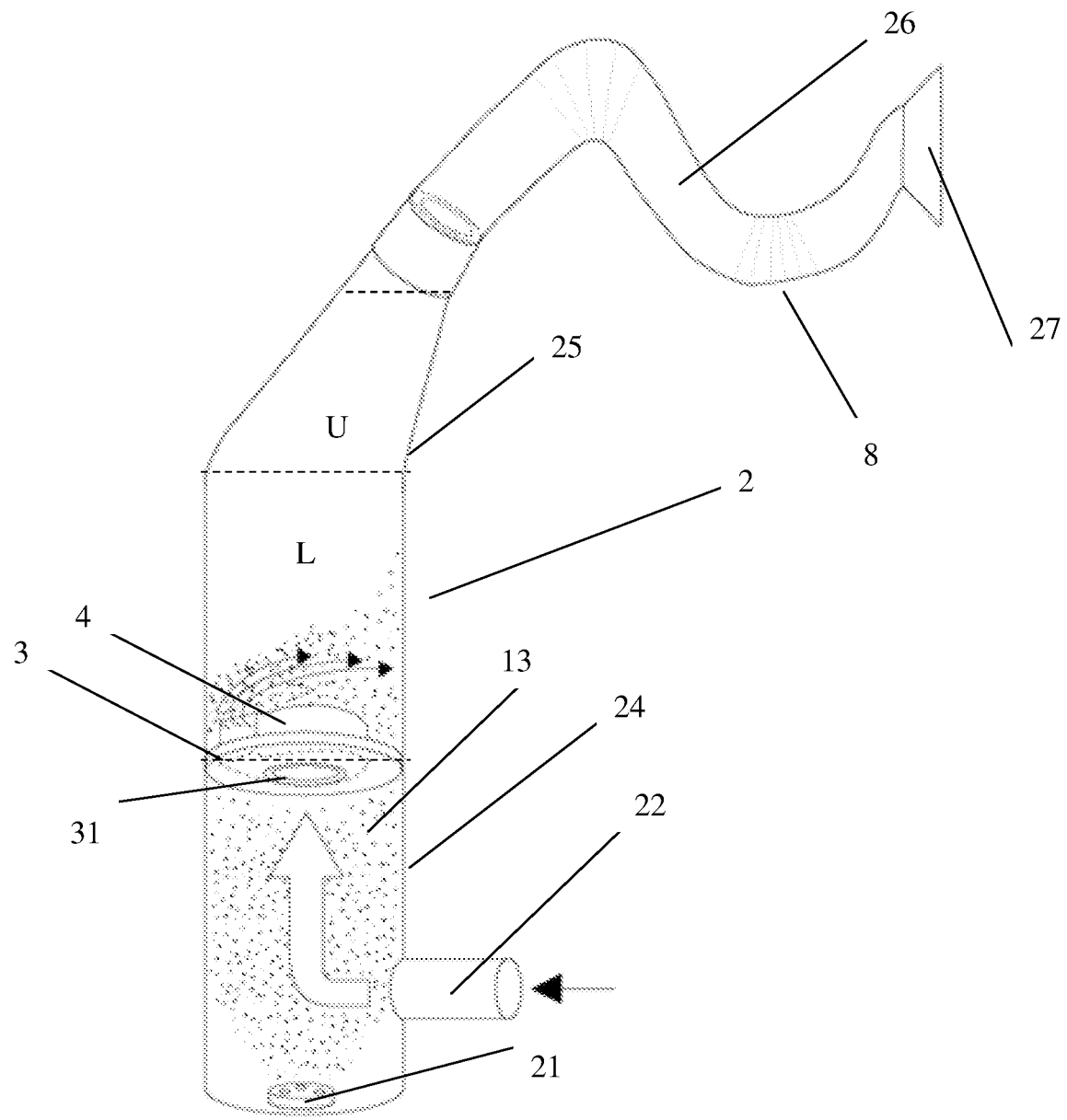
FIG. 9 is a diagram of a humid air stream generator according to an embodiment of the present application.

FIG. 9 is a diagram of a humid air stream generator according to an embodiment of the present application. As shown in FIG. 9, the humid air stream generator comprises a hollow cylindrical chamber 2 with a mist generator 21 placed inside at the bottom of the hollow cylindrical chamber 2 for generating a continuous stream of humid air, an inlet tubing 22 attached to the hollow cylindrical chamber 2 for feeding a stream of incoming air, an outlet tubing 8 attached to the top of the hollow cylindrical chamber 2, a suction fan 4 placed between the outlet tubing 8 and the mist generator 21 for forming the continuous stream of humid air and the stream of incoming air into a cyclonic air flow which spiral upward towards the outlet tubing, surprisingly eliminates accumulation of water droplets or condensation at an outlet region of the hollow cylindrical chamber 2. The stream of incoming air can be returned air or ambient air. It dependents on actual requirements.

It is discovered that when the mixed air flow is created in a cyclonic flow pattern moving along the inside wall of the hollow cylindrical chamber 2 and spiral upwards from the lower outflow region L to the upper airflow region U, and then towards the outlet tubing 8 at the upper end of the hollow cylindrical chamber 2 as shown in FIG. 9, the accumulation of water droplets or condensation at the outflow outlet(s) region of the hollow cylindrical chamber 2 as well as the inner wall of the hollow cylindrical chamber 2 are surprisingly disappeared.

As shown in FIG. 9, the suction fan 4 is a centrifugal fan that is attached securely onto a circular plate 3 with a centre hole 31 on the circular plate 3 to allow the continuous stream of humid air and the stream of incoming air to pass through the centrifugal fan, so as to mix them together in forming the cyclonic air flow. The humid air produced by the mist generator 21 is being sucked and passed through the suction fan 4 that is placed at a position around the centre region inside the hollow cylindrical chamber 2.

The centrifugal fan 4 can be any type on the market. Optionally, the centrifugal fan 4 can be arranged by itself at a position around the centre region inside the hollow cylindrical chamber 2 independently, so the circular plate 3 can be omitted.

Figure 12:
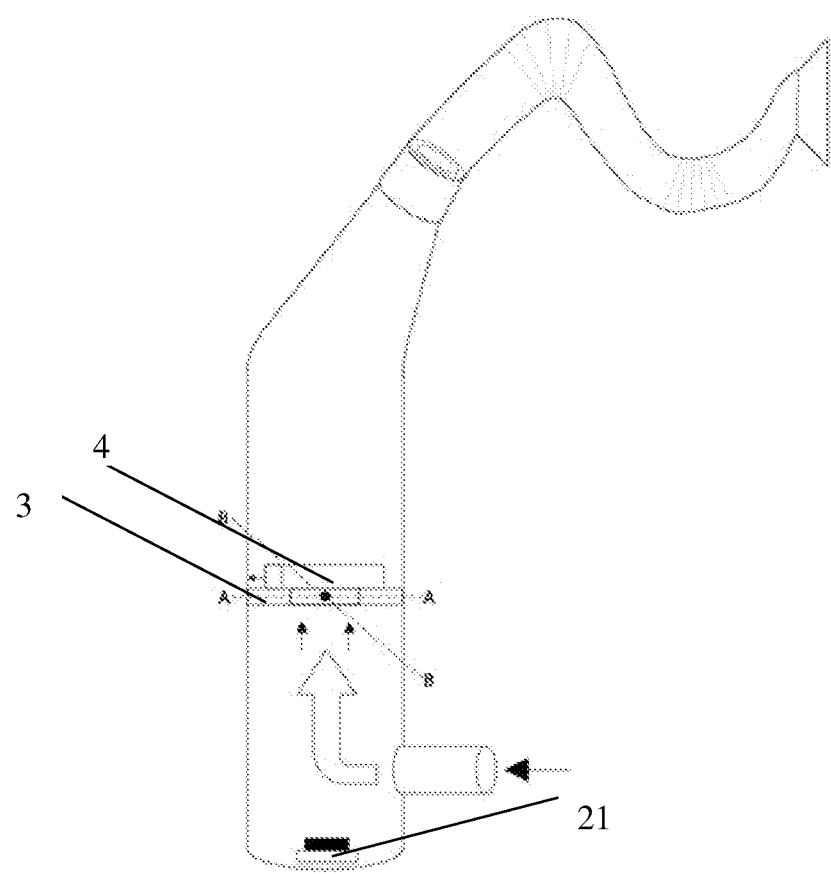
FIG. 12 is a diagram showing a cross-section of the humid air stream generator according to a further embodiment of the present application.

In an embodiment, the centrifugal fan 4 on the circular plate 3 can be placed in a lay-flat position as shown in FIG. 9. In another embodiment, the centrifugal fan can be tilted by tilting its attached circular plate 3 at a suitable angle with reference to the horizontal axis marked AA' in FIG. 12 to provide more design flexibilities in the applications of the current application. The tilting angle is in the range of 0 degree to 80 degree upwards from the horizontal axis or 0 degree to 80 degree downwards from the horizontal axis. Optionally, the tilting angle is in the range from 5 degree to 75 degree upwards or downwards from the horizontal axis. Preferably, the tilting angle is in the range from 25 degree to 60 degree upwards or downwards from the horizontal axis. More preferably, the tilting angle is in the range from 35 degree to 50 degree upwards or downwards from the horizontal axis.

In the present application, the hollow cylindrical chamber can be any cylindrical shape. FIG. 9 comprises shown a preferred arrangement of the hollow cylindrical chamber 2. As shown in FIG. 9, the hollow cylindrical chamber 2 comprises a vertical cylindrical lower chamber 24 and a tilted taper upper chamber 25 attached to the vertical cylindrical lower chamber 24. The outlet tubing 8 comprises a curving tubing 26 attached to the tilted taper upper chamber 25 and a nozzle 27 mounted on the curving tubing 26. As shown in FIG. 9, the suction fan 4 is arranged in the middle of the vertical cylindrical lower chamber 24. As shown in FIG. 9, the accumulation of water droplets or condensation at the tilted taper upper chamber 25 as well as the inner wall of the curving tubing 26 is surprisingly disappeared.

The idea of placing the suction fan around the centre region inside the vertical cylindrical lower chamber 24 in between the mist generator 21 at the bottom and the outflow region at the top in blowing out the air at such an unexpected short gap at 0 degree angle directly onto the inside wall in creating a spinning air flow as illustrated in FIG. 9 is technically unique and unobvious.

Although FIG. 9 just shows one outlet tubing 8, one skilled in the art knows that more than one outlet tubing that comprises a curving tubing attached to the tilted taper upper chamber and a nozzle mounted on the curving tubing can be affixed at the outlet flow region to achieve multi-outlet flow points for attractive commercial advantage.

Figure 10:
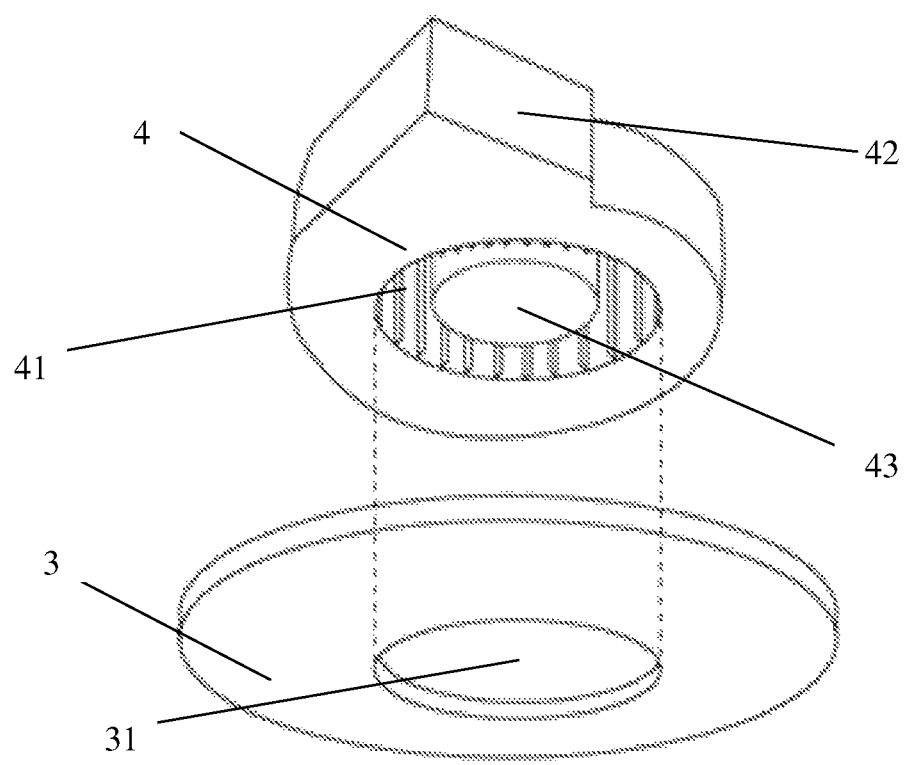
FIG. 10 is a diagram showing the centrifugal fan and circular plate of the humid air stream generator according to another embodiment of the present application.

FIG. 10 is a diagram showing the centrifugal fan and circular plate of the humid air stream generator according to another embodiment of the present application. As shown in FIG. 10, the centrifugal fan 4 comprises a drum housing with fins 41 arranged at its middle point 43. The drum housing further comprises an air outlet 42 which discharge mixed air in a direction in parallel with or tilted at a small angle to a tangent of the drum housing at the air outlet so as to generate the cyclonic air flow along a circumference of an inner wall of the hollow cylindrical chamber 2. As shown in FIG. 10, the circular plate 3 is attached securely onto an inner wall of the hollow cylindrical chamber 2, wherein the fins of the centrifugal fan 4 is right above the centre hole 31 of the circular plate 3. Of course, the centrifugal fan and circular plate of present application can be arranged in any other variation as if they can generate a cyclonic air flow.

Figure 11:
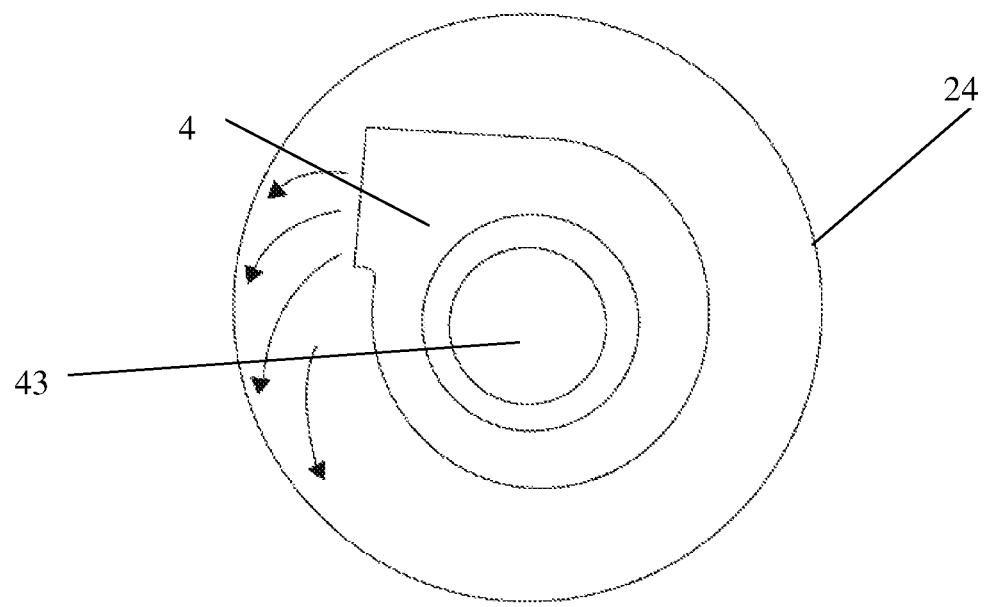
FIG. 11 is a diagram showing the centrifugal fan generates a circular air flow along the circumference of the inner wall of the hollow cylindrical chamber.

As shown in FIG. 11, the centrifugal fan 4 shown in FIG. 10 can generate a circular air flow along the circumference of the inner wall of the hollow cylindrical chamber 2. The cyclonic air flow comprises its flow angle increase as it spiral up, wherein, the flow angle increases from as low as 5 degree up to a maximum of 80 degree to the horizontal axis as it spiral upwards until it reaches the extreme top of the hollow cylindrical chamber 2.

Figure 13:
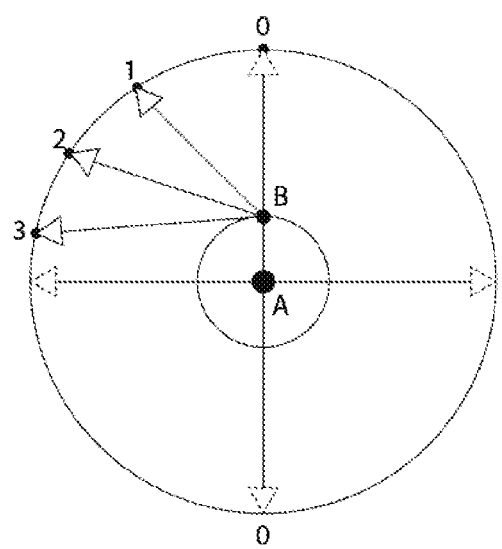
FIG. 13 is a diagram showing air flow conditions that generate the spinning effect of the cyclonic air flow.

FIG. 13 is a diagram showing air flow conditions that generate the spinning effect of the cyclonic air flow. As shown in FIG. 13, there is no cyclonic air flow when the air direction is blown from the centre point A in any direction. Referring FIG. 13, there is also no cyclonic air flow when the air direction is blown from the point B to point 0 and from point B to point 0'.

However, for example, the air flow spins under the following conditions:
1) Air direction from point B to point 1.
2) Air direction from point B to point 2.
3) Air direction from point B to point 3.

Accordingly, the cyclonic air flow generates in a direction in parallel with or tilted at a small angle to a tangent of the centrifugal fan 4 so as to form the cyclonic air flow along a circumference of an inner wall of the hollow cylindrical chamber 2. The flow angle of the cyclonic air flow that spiraled along the inside wall of the hollow cylindrical chamber 2 is in the range of 5 degree to 80 degree to the horizontal axis; preferably 25 degree to 60 degree to the horizontal axis and more preferably 35 degree to 50 degree to the horizontal axis.

Figure 14:
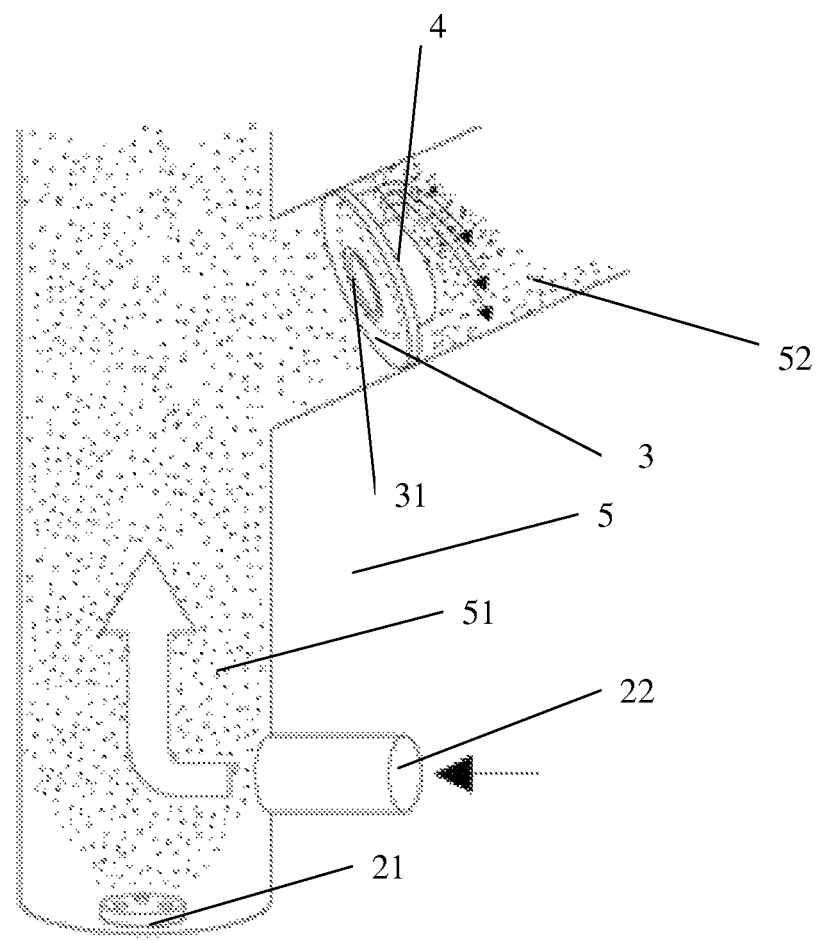
FIG. 14 is a diagram of a humid air stream generator according to another embodiment of the present application.

FIG. 14 is a diagram of a humid air stream generator according to another embodiment of the present application. As shown in FIG. 14, the humid air stream generator comprises a hollow cylindrical chamber 5 with a mist generator 21 placed inside at the bottom of the hollow cylindrical chamber 5 for generating a continuous stream of humid air, an inlet tubing 22 attached to the hollow cylindrical chamber 5 for feeding a stream of incoming air, an outlet tubing (unshown) attached to the hollow cylindrical chamber 5, a suction fan 4 placed between the outlet tubing 52 and the mist generator 21 for forming the continuous stream of humid air and the stream of incoming air into a cyclonic air flow which spiral upward towards the outlet tubing, surprisingly eliminates accumulation of water droplets or condensation at an outlet region of the hollow cylindrical chamber 5. The stream of incoming air can be returned air or ambient air.

As shown in FIG. 14, the hollow cylindrical chamber 5 comprises a vertical cylindrical lower chamber 51 and an extended outlet flow channel 52 branched out from the vertical cylindrical lower chamber 51. The outlet tubing is attached to the extended outlet flow channel 52. In present embodiment, the suction fan 4 is placed in the extended outlet flow channel 52. As shown in FIG. 14, the accumulation of water droplets or condensation in the extended outlet flow channel 52 above the suction fan 4 is surprisingly disappeared. Similarly, the accumulation of water droplets or condensation in the outlet tubing attached to the extended outlet flow channel 52 is also surprisingly disappeared. The work principle comprises been described above and is not recited here for conciseness.

In present embodiment, the centrifugal fan 4 on the circular plate 3 can be placed vertical to the axis of the extended outlet flow channel 52. In other embodiment, the centrifugal fan 4 can be arranged in other direction. The structure and arrangement of the suction fan 4 can be completed according to the above description and are not recited here for conciseness.

In one embodiment of present application, the extended outlet flow channel 52 is removable and replaceable so as to achieve more variation and flexibility in the application of such invention.

Although FIG. 14 just shows one extended outlet flow channel 52, one skilled in the art knows that more than one extended outlet flow channels can be branched out from the vertical cylindrical lower chamber to achieve multi-outlet flow points for attractive commercial advantage.

The inventor does not know why the surprised disappearance of water condensation at the inside wall of the outlet tubing and the hollow cylindrical chamber by just arranging a suction fan for generating a cyclonic air flow. This is probably due to the centrifugal effect of the spiral airflow created by arranging the suction fan or tilting the angle of the fan which causes the bigger and heavier mist droplets to spin outwards and collide onto the wall and stay at the surface of the wall. This process continues until the bigger and heavier water droplets are progressively diminished and eliminated as it progressively spirals upwards towards the air outlet at the top end of the hollow cylindrical chamber.

This air flow design not only permits the humidifier equipment to achieves a condensation-free humid air stream, it is also a simple design that is technically superior and easy to maintain without the need to incur modification of the equipment like adding heater, etc in the air flow system to overcome the condensation problem.

Such technical design not only simplifies and minimizes the product component parts required in the creation and formation of a spinning air flow, it also shorten the height of the vertical cylindrical chamber due to optimum spinning efficiency to reduce material cost and saving space in the real-life application of such product in a often space limited compact production facility.

The invention effectively eliminate the unwanted water droplets or condensation formed at the inside wall of the outflow tubing and the inside wall of the upper outflow region of the humid air stream generator in a simple and unconventional methodology.

The invention claimed is:

1. A humid air stream generator, comprising a hollow cylindrical chamber with a mist generator placed inside at the bottom of the hollow cylindrical chamber for generating a continuous stream of humid air, an inlet tubing attached to the hollow cylindrical chamber for feeding a stream of incoming air, an outlet tubing attached to the hollow cylindrical chamber, a suction fan placed between the outlet tubing and the mist generator for forming the continuous stream of humid air with the stream of incoming air into a cyclonic air flow which spiral upward towards the outlet tubing, so as to eliminate accumulation of water droplets or condensation at an outlet region of the hollow cylindrical chamber; the suction fan is a centrifugal fan to allow the continuous stream of humid air and the stream of incoming air to pass through the centrifugal fan, so as to mix them together in forming the cyclonic air flow; wherein, the hollow cylindrical chamber comprises a vertical cylindrical lower chamber and a tilted taper upper chamber attached to the top of the vertical cylindrical lower chamber, the outlet tubing is attached to the tilted taper upper chamber, and the suction fan is placed in the vertical cylindrical lower chamber.

2. The humid air stream generator according to claim 1, wherein, the outlet tubing further comprising a curving tubing attached to the tilted taper upper chamber and a nozzle mounted on the curving tubing.

3. The humid air stream generator according to claim 1, wherein, the hollow cylindrical chamber comprises a vertical cylindrical lower chamber and an extended outlet flow channel branched out from the vertical cylindrical lower chamber, the outlet tubing is attached to the outlet flow channel, and the suction fan is placed in the outlet flow channel.

4. The humid air stream generator according to claim 1, wherein, the hollow cylindrical chamber comprises a vertical cylindrical chamber.

5. The humid air stream generator according to claim 4, wherein, the outlet tubing is attached to a point along the circumference of the vertical cylindrical chamber that is at least 75 degree away from an air outlet of the centrifugal fan.

6. The humid air stream generator according to claim 4, wherein, the hollow cylindrical chamber further comprises a main chamber connected to the vertical cylindrical chamber.

7. The humid air stream generator according to claim 1, wherein, the centrifugal fan is attached securely onto a circular plate with a centre hole on the circular plate.

8. The humid air stream generator according to claim 1, wherein, the centrifugal fan comprises a drum housing with fins arranged at its middle point, wherein, the drum housing further comprises an air outlet which discharges mixed air in a direction in parallel with or tilted at a small angle to a tangent of the drum housing at the air outlet so as to form the cyclonic air flow along a circumference of an inner wall of the hollow cylindrical chamber.

9. The humid air stream generator according to claim 8, wherein, the circular plate is attached securely onto an inner wall of the hollow cylindrical chamber, wherein the fins of the centrifugal fan is right above the centre hole of the circular plate.

10. The humid air stream generator according to claim 9, wherein, the centrifugal fan is tilted to a horizontal axis at an angle from 0 degree to 80 degree upwards or downwards from the horizontal axis.

11. The humid air stream generator according to claim 10, wherein, the cyclonic air flow comprises its flow angle increase as it spiral up, wherein, the flow angle increases from as low as 5 degree up to a maximum of 80 degree as it spiral upwards until it reaches the extreme top of the hollow cylindrical chamber.

12. The humid air stream generator according to claim 1, wherein, further comprising a heater located inside the hollow cylindrical chamber.

13. A humid air stream generator, comprising a hollow cylindrical chamber with a mist generator placed inside at the bottom of the hollow cylindrical chamber for generating a continuous stream of humid air, an inlet tubing attached to the hollow cylindrical chamber for feeding a stream of incoming air, an outlet tubing attached to the hollow cylindrical chamber, a suction fan placed between the outlet tubing and the mist generator for forming the continuous stream of humid air with the stream of incoming air into a cyclonic air flow which spiral upward towards the outlet tubing, so as to eliminate accumulation of water droplets or condensation at an outlet region of the hollow cylindrical chamber; the suction fan is a centrifugal fan to allow the continuous stream of humid air and the stream of incoming air to pass through the centrifugal fan, so as to mix them together in forming the cyclonic air flow; wherein the hollow cylindrical chamber comprises a vertical cylindrical lower chamber and a recessed roof top, wherein the centrifugal fan is arranged outside the vertical cylindrical lower chamber but at a step surface of the recessed roof top, the outlet tubing is attached to the recessed roof top at a same level of the centrifugal fan.

14. The humid air stream generator according to claim 13, wherein, the centrifugal fan is arranged horizontally or vertically on the step surface of the recessed roof top.

15. The humid air stream generator according to claim 13, wherein, the recessed roof top have an arc-shaped structure connected to an air outlet of the centrifugal fan and a tangent structure tangentially connected to the arc-shaped structure, wherein the outlet tubing can be attached to an opening of the tangent structure.

16. A humid air stream generator, comprising a hollow cylindrical chamber with a mist generator placed inside at the bottom of the hollow cylindrical chamber for generating a continuous stream of humid air, an inlet tubing attached to the hollow cylindrical chamber for feeding a stream of incoming air, an outlet tubing attached to the hollow cylindrical chamber, a suction fan placed between the outlet tubing and the mist generator for forming the continuous stream of humid air with the stream of incoming air into a cyclonic air flow which spiral upward towards the outlet tubing, so as to eliminate accumulation of water droplets or condensation at an outlet region of the hollow cylindrical chamber; the suction fan is a centrifugal fan to allow the continuous stream of humid air and the stream of incoming air to pass through the centrifugal fan, so as to mix them together in forming the cyclonic air flow; wherein the hollow cylindrical chamber comprises a vertical cylindrical lower chamber, a first recessed roof top and a second recessed roof top; wherein a first centrifugal fan is arranged vertically outside the vertical cylindrical lower chamber but at a step surface of the first recessed roof top, a second centrifugal fan is arranged horizontally outside the first recessed roof top but at a step surface of the second recessed roof top, or a first centrifugal fan is arranged horizontally outside the vertical cylindrical lower chamber but at a step surface of the first recessed roof top, a second centrifugal fan is arranged vertically outside the first recessed roof top but at a step surface of the second recessed roof top.

* * * * *